United States Patent [19]

Wheelock

[11] 3,768,202

[45] Oct. 30, 1973

[54] FLOWER HOLDER

[76] Inventor: Julia E. Wheelock, 1045 11st St., Beloit, Wis. 53511

[22] Filed: Jan. 17, 1972

[21] Appl. No.: 218,205

[52] U.S. Cl................. 47/41.13, 211/60, 273/58
[51] Int. Cl............................................. A01g 5/00
[58] Field of Search.......................... 161/7, 12–13, 161/16–17, 27–28, 31; 47/41–41.13; 34/15 EE, 15 GG, 5 QQ; 273/199 R, 58 D; 46/30; 211/60

[56] References Cited
UNITED STATES PATENTS

| | | | |
|---|---|---|---|
| 2,791,868 | 5/1957 | Viken | 46/30 |
| 2,982,051 | 5/1961 | Wheelock | 47/41.13 |
| 720,132 | 2/1903 | Green | 47/47.11 |
| 2,211,330 | 8/1940 | Hochberg | 34/15 EE |

FOREIGN PATENTS OR APPLICATIONS 1,256,038   2/1971   France

*Primary Examiner*—Robert E. Bagwill
*Attorney*—Vernon J. Pillote

[57] ABSTRACT

A flower holder for use in different vases comprising a hollow, generally spheroidal body formed of resilient plastic, the body having a plurality of longitudinally arched segments with their ends joined together adjacent the axis of the body, the segments having stem receiving openings spaced therealong and the segments being angularly spaced apart so that the body is longitudinally continuous but transversely discontinuous to allow the body to radially conform to different vases.

6 Claims, 7 Drawing Figures

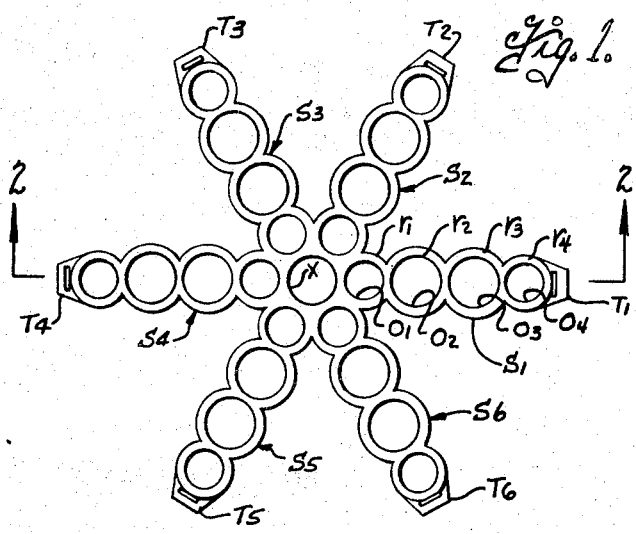
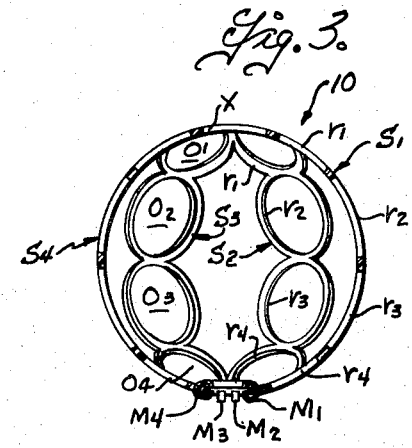
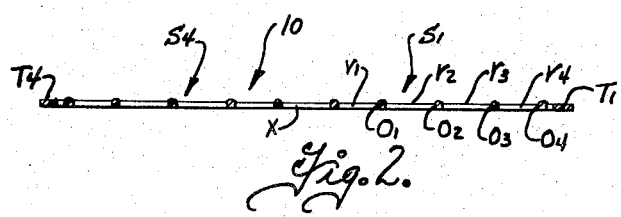
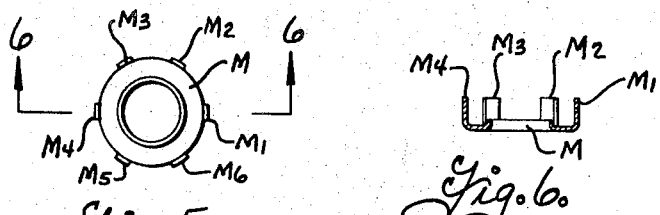
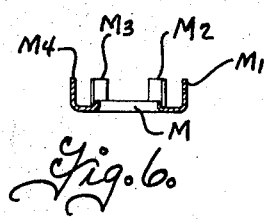
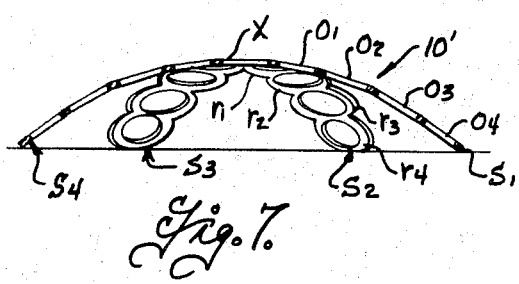
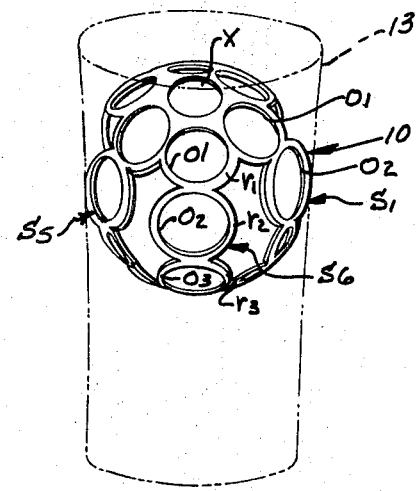

FLOWER HOLDER

BACKGROUND OF THE INVENTION

Many flower holders merely rest on the bottom of a vase or receptacle and must accordingly be made relatively heavy and with a wide base in order to provide a stable support for flowers. The present invention pertains to a flower holder which is adapted to engage the side walls of a vase to be stabilized and supported thereby at any desired vertical location between the top and bottom of the vase.

It has heretofore been proposed, as disclosed in the U.S. Pat. to J. E. Wheelock No. 2,982,051 issued May 2, 1961, to make a flower holder which is adjustable in size and shape to conform to vases of different size and configuration. The flower holder disclosed in that patent utilized a hollow body formed of hexagonal mesh wire and relied upon the deformability of the hexagonal mesh wire to enable reshaping of the body into different sizes and shapes for different vases. While the flower holder disclosed in that patent did function satisfactorily to support the flower stems in different vases, it was objectionable in that it necessitated a large amount of hand work to form the holder from the hexagonal mesh wire and was consequently expensive to produce. Moreover, the mesh wire was objectionable in many cases since it intended to scratch or mar the vase and, if made of a metal corrodible in water, sometimes caused discoloration and staining of the vase.

SUMMARY OF THE INVENTION

The present invention relates to a flower holder of the type which engages the side walls of a vase to be stabilized and supported thereby. The flower holder comprises a hollow generally spheroidal body formed of a resilient plastic and which has a multiplicity of longitudinally arched segments with their ends joined together adjacent the axis of the body. The segments each have a plurality of stem receiving openings spaced therealong and the segments are angularly spaced apart intermediate the ends of the body so that the segments can be individually flexed to conform to different vases, and to also resiliently retain the holder in a selected vertical position in the vase. The body can be economically molded in the form of a generally star-shaped blank with the segments integrally joined together at one end and extending outwardly in angularly spaced relation, and the blank thereafter erected to form a hollow, generally spheroidal body.

Various important objects of this invention are to provide a flower holder which is adapted to engage and conform to the side walls of vases of different size and shape to be stabilized and supported thereby; which can be economically formed; and which will not mar or stain the vase.

These, together with other features and advantages of the invention will be more apparent from the following description when taken in connection with the accompanying drawings wherein:

FIG. 1 is a plan view of a blank used in forming the flower holder;

FIG. 2 is a sectional view taken on the plane 2—2 of FIG. 1;

FIG. 3 is a sectional view through a flower holder embodying the present invention;

FIG. 4 is a perspective view of the flower holder showing the same in use in a vase;

FIG. 5 is a plan view of a clamp ring for joining the segments at one end of the flower holder body shown on approximately twice the scale of FIG. 3;

FIG. 6 is a sectional view through the clamp ring taken on the plane 6—6 of FIG. 5; and FIG. 7 is a sectional view through a modified form of blank for use in making the flower holder.

The flower holder of the present invention comprises a hollow generally spheroidal body 10 formed of a resilient plastic and having a multiplicity of longitudinally arched segments $S_1-S_6$ joined together adjacent the axis of the body. The segments each have a plurality of stem receiving openings $O_1-O_4$ spaced therealong and the segments are angularly spaced apart so that the completed flower holder body is axially continuous but transversely discontinuous to enable the flower holder body to radially conform to the side walls of different vases such as shown at 13 in FIG. 4, to be stabilized and supported thereby.

The flower holder is advantageously formed from a generally star-shaped blank having a multiplicity and preferably six or more segments designated $S_1-S_6$ which are integrally joined together at one end and radiate outwardly in angularly spaced relation. The segments each conveniently comprise a plurality of ring-shaped elements herein designated $r1-r4$, integrally joined together in edge-to-edge relation and defining the aforementioned stem receiving openings $O_1-O_4$ at spaced locations along the segments. The ring-shaped elements $r1$ at one end of each of the segments are integrally joined together in a circular pattern as shown in FIG. 1 and define a central opening $X$, and the segments extend outwardly from the central opening in angularly spaced relation. The end ring elements $r1$ and $r4$ are located adjacent the axis of the flower holder body 10, and are preferably made relatively smaller than the intermediate elements such as $r2$ and $r3$ that are located adjacent the major transverse dimension of the body. The size of the end rings $r1$ and $r4$ is selected so that they are contiguous when arranged in a circular pattern around the central opening $X$ and the intermediate ones of the ring-like elements $r2$ and $r3$ are made substantially larger to reduce the circumferential spacing between adjacent segments $S_1-S_6$ intermediate the upper and lower ends of the flower holder body. Moreover, since the intermediate ring-shaped elements such as $r2$ and $r3$ are disposed at a shallow angle to the vertical when the holder is disposed in a vase, it is advantageous to make the intermediate openings $O_2$ and $O_3$ relatively larger than the end openings $r1$ and $r4$ to facilitate passage of the flower stems therethrough.

The ring elements $r4$ at the lower ends of the segments are connected in a circular pattern to form the blank into the generally spheroidal flower holder body. In the preferred embodiment shown, the outer ends of the segments are interconnected by a ring member $m$ having a plurality of angularly spaced fingers $m1-m6$. The outer ends of the segments $S_1-S_6$ of the blank are conveniently provided with apertured tabs $T_1-T_6$ and the fingers $m1-m6$ extend through the respective apertured tabs to hold the outer ends of the segments in a generally circular pattern. The ring element 21 can be preformed of a deformable metal such as aluminum or brass with the fingers $m1-m6$ extending transverse to the plane of the ring member $m$ as shown in FIGS. 5 and 6 and the fingers $m1-m6$ bent over after insertion through the tabs on the segments as shown in FIG. 3, to clamp the outer ends of the segments in a circular pattern. Advantageously, the ring member $m$ is dimensioned to have an outer diameter no larger than the central opening $X$ in the blank and the tabs $T_1-T_6$ dimensioned such that they can be assembled on the fingers $m1-m6$ of the ring without overlapping. With this arrangement, connection of the outer ends of the segments by ring member $m$ can be readily effected by inserting an elongated upright mandrel (not shown) through the opening $X$ in the blank; positioning the ring member on the end of the upper end of the mandrel with the fingers facing upwardly; assembling the tabs onto the fingers, and thereafter folding the tabs inwardly by a suitable press operated forming member to erect the blank into a generally spheroidal body as shown in FIG. 3.

The integral joining of the ring-shaped elements $r1$ in a circular pattern at locations radially outwardly of the axis of the blank as shown in FIG. 1 controls flexing of the outwardly extending segments $S_1-S_6$ and radially stiffens the generally spheroidal-shaped flower holder body when it is erected. The blank of FIG. 1 can be molded as a flat blank as shown in FIG. 2 or, alternatively, can be molded in the form of a shallow arch as shown at $10'$ in FIG. 7 so that the central portion of the star-shaped blank has an arched configuration.

From the foregoing it will be seen that the flower holder body can be economically formed as by molding a generally star-shaped blank, and the blank then erected by interconnecting the outer ends of the segments to form a generally spheroidal flower holder body. The segments of the flower holder body are longitudinally arched and angularly spaced about the axis of the body and are radially deformable so as to conform the flower holder body to the side walls of different vases. The flower holder is stabilized and supported in the vase by engagement with the side walls of the vase and a flower holder of a given cross-sectional dimension can accommodate vases having a similar or substantially smaller cross-section. While a single large flower holder can be deformed to accommodate vases of widely different size, it is preferable to make the flower holders in two or three different sizes with larger diameter holders being provided for larger vases. For example, one size flower holders can have a diameter of about 3½ inches to fit vases of that size and smaller and a flower holder for larger vases can be formed with a diameter of 4½ inches to 5 inches. Larger size holders are of course possible. Alternatively, several smaller size flower holders can be arranged in side-by-side relation in very large vases.

The flower holder body can be formed of any suitable resilient plastic, for example polyethylene, polypropylene, resilient polystyrene, etc. and the thickness of the plastic is selected so as to provide a body which is normally shape sustaining but yet sufficiently flexible to conform to the side walls of different vases. The ring-shaped elements not only provide openings for stems to pass therethrough but also define notches at their outer sides of the segments which can also engage and stabilize the stems of flowers.

The embodiments of the invention in which an exclusive property or privilege is claimed are defined as follows:

1. A flower holder adapted to conform to the side walls of different vases to be stabilized and supported thereby comprising, a hollow generally spheroidal body of resilient plastic including a multiplicity of elongated body segments having one end thereof integrally joined together at one end of the body and extending from said one end of the body to the other in longitudinally arched and angularly spaced relation about an axis through said one end of the body, said elongated body segments each including a plurality of ring-shaped elements integrally connected in edge-to-edge relation and defining a plurality of stem receiving openings spaced apart along the segment, the ring-shaped elements at one end of the several body segments being integrally joined in a generally circular pattern at said one end of the body and the body having a central stem receiving opening at said one end inwardly of said circular pattern, intermediate ones of the openings in each body segment being larger than the openings adjacent the ends of the body segments, and an annular clamp member at said other end of the body having angularly spaced clamp elements thereon interconnecting the other ends of said body segments to hold said other ends of the body segments against relative movement while permitting individual flexing of said body segments intermediate the ends of the body to conform to side walls of different vases.

2. A flower holder according to claim 1 wherein said body has at least six elongated body segments.

3. A flower holder adapted to conform to the side walls of different vases to be stabilized and supported thereby consisting of a one-piece generally star-shaped member of resilient plastic having a set of elongated segments integrally joined together at one end and extending outwardly in angularly spaced relation, each elongated segment consisting of a plurality of ring-shaped elements defining generally circular openings and integrally joined together in edge-to-edge relation, the ring-shaped elements at said one end of the segments of the set being arranged in a circular pattern around a central opening, and means interconnecting the ring-shaped elements at the other ends of the segments of the set in a generally circular pattern similar to the first-mentioned circular pattern and coaxial therewith to form a hollow generally spheroidal body with the segments extending in longitudinally arched and angularly spaced relation about the axis of the spheroidal body.

4. A flower holder according to claim 3 wherein said means interconnecting the ring-shaped elements at the other ends of the segments includes an annular member having clamp means engageable with the ring shaped elements on said other ends of the segments of the set.

5. A flower holder according to claim 3 wherein the ring-shaped elements intermediate the ends of each segment are of larger size than the ring-shaped elements adjacent the ends of the segments.

6. A flower holder according to claim 3 wherein said star-shaped member has six segments.

* * * * *